July 7, 1925.

A. H. BURKEMAN 1,544,802

ICE CREAM DISPENSING DEVICE

Filed June 30, 1924  5 Sheets-Sheet 1

Inventor
Axel H. Burkeman
By his Attorneys
Merchant and Keeton

July 7, 1925.

A. H. BURKEMAN 1,544,802

ICE CREAM DISPENSING DEVICE

Filed June 30, 1924 5 Sheets-Sheet 2

Fig.3

Inventor
Axel H. Burkeman
By his Attorneys

July 7, 1925.

A. H. BURKEMAN 1,544,802

ICE CREAM DISPENSING DEVICE

Filed June 30, 1924 5 Sheets-Sheet 3

Inventor
Axel H. Burkeman
By his Attorneys
Merchant and Wilson

July 7, 1925.                                              1,544,802
                        A. H. BURKEMAN
                   ICE CREAM DISPENSING DEVICE
                   Filed June 30, 1924     5 Sheets-Sheet 5

Inventor
Axel H. Burkeman
By his Attorneys
Merchant and Kegost

Patented July 7, 1925.

1,544,802

UNITED STATES PATENT OFFICE.

AXEL H. BURKEMAN, OF MINNEAPOLIS, MINNESOTA.

ICE-CREAM-DISPENSING DEVICE.

Application filed June 30, 1924. Serial No. 723,206.

*To all whom it may concern:*

Be it known that I, AXEL H. BURKEMAN, a citizen of United States, residing at Minneapolis, in the county of Hennepin and State of Minnesota, have invented certain new and useful Improvements in Ice-Cream-Dispensing Devices; and I do hereby declare the following to be a full, clear, and exact description of the invention, such as will enable others skilled in the art to which it appertains to make and use the same.

My present invention has for its object to provide an ice cream dispensing device, and to this end it consists of the novel devices and combination of devices hereinafter described and defined in the claims.

In the accompanying drawings, which illustrate the invention, like characters indicate like parts throughout the several views.

Referring to the drawings.

The numeral 15 indicates a standard ice cream can partly filled with bulk ice cream 16.

The ice cream dispensing device is self-contained and includes a cover 17 having a capping flange 18 adapted to be telescoped onto the open upper end of the can 15. This cover 17 is detachably secured to the can 15 by a plurality of thumb screws 19, and has a central rectangular opening surrounded by an upstanding guide flange 20.

Working through the flange opening in the cover 17 is a long upright endwise movable casing 21 rectangular in cross section and having a closed top, and by its polygonal engagement with the guide flange 20 is held from turning but is free to rise and fall in the can 15. At the lower end of the casing 21 is a disc-like follower 22 having a peripheral depending flange that closely engages the internal wall of the can 15. On the upper face of the follower 22 is an upstanding rectangular flange onto which the lower end of the casing 21 is telescoped and rigidly secured.

Below the follower 22 is a radially extended spiral conveyor 23 back of which and parallel thereto is a scoop 24 that is segmental in vertical section and has closed ends, the outer of which works close to the internal wall of the cam 15. The lower edge portion of the scoop 24 is extended forward under the conveyor 23 and affords a scraper 25 that is in direct contact with the ice cream 16. Leading from the inner end of the scoop 24, at the top thereof, is an upstanding cylindrical tube 26 that is open at both ends and affords a packing chamber 27 into which ice cream is packed by the conveyor 23, as the same is removed from the brick of ice cream 16, by the scoop 24. This tube 26 is rigidly secured to the scoop 24, extends upward from the flanged opening 28 in the follower 22 at the axis thereof, and is rotatably mounted therein.

The shaft of the spiral conveyor 23 is journaled in the two ends of the scoop 24 and in the depending diametrically offset bearing 29 on a horizontally disposed ring gear 30 rotatably mounted on an internal flange 31 formed with the peripheral flange of the follower 22. A bracket 32 diametrically opposite the bearing 29 rigidly connects the scoop 24 to the ring gear 30, which bracket and bearing secure the conveyor 23 and scoop 24 to said ring gear for swinging movement within the can 15 under the rotation of said gear and around the axis of the follower 22.

Teeth are formed on the lower edge of the peripheral flange of the follower 22 and afford a stationary ring gear 33. On the shaft of the conveyor 23, at the bearing 29, is a pinion 34 which meshes with the stationary ring gear 33 and is caused to rotate under the rotation of the ring gear 30 and hence rotates the conveyor 23 in the direction of the arrow mark therein in Fig. 2.

To rotate the ring gear 30 there is journaled on the follower 22 and a bearing on an upright frame 35 rigidly secured to said follower within the casing 21, an upright shaft 36 having on its lower end a spur pinion 37 which meshes with said ring gear and having on its upper end a bevel gear 38 which meshes with a bevel gear 39 on a horizontal shaft 40 journaled in said frame and the sides of the casing 21. The shaft 40 has, outward of said casing, a hand crank 41 by which said shaft may be rotated.

A dipper 42 in the form of a hemisphere has on its rim a cutting edge, and which dipper is normally held inverted over the open upper end of the tube 26 and affords a cap for the packing chamber 27 and into which dipper the ice cream is packed from said chamber under the action of the conveyor 23. The dipper 42 has a pair of diametrically opposite trunnions 43 which are journaled in the sides of a horizontally disposed U-shaped carriage 44 and support said dipper for complete rotary movement.

The carriage 44 is mounted on a standard 45 and has on its back a dove tail block 46 slidably mounted in a correspondingly formed channel 47 in the face of said standard. This standard 45, at its lower end, is hinged to a pair of bearing lugs 48 on the follower 22 for swinging movement from an upright position either forwardly or backwardly in respect to the casing 21. On the hinged or lower end of the standard 45 is a rearwardly projecting apertured foot 49 through which projects a thumb nut-equipped stud 50 anchored to the follower 22. A pair of opposing coiled springs 51 on the stud 50, engage opposite faces of the foot 49 and normally yieldingly hold the standard 45 in an upright position with freedom for tilting movement either forward or backward.

To impart a one-half rotation to the inverted dipper 42, and thereby cut a sphere of ice cream 52 from the mass that is packed in the chamber 27 and dipper 42, carry said sphere of ice cream upward in the righted dipper 42 and then tip said dipper to discharge the sphere of ice cream therefrom and then invert said dipper and return the same to a capping position over the packing chamber 27, the following connections are provided to wit:—A carrier for the dipper 42 and carriage 44 in the form of a sprocket chain 53 is arranged to run over vertically aligned upper and lower sprocket wheels 55 and 54 and a relatively smaller sprocket wheel 56 located forward and below the sprocket wheel 55. All of the sprocket wheels 54, 55 and 56 are idle and journaled on the frame 35. The lower sprocket wheel 54 is axially aligned with the trunnions 43 when the dipper 42 is in normal or filling position. A large sprocket wheel 57 is loosely mounted on the shaft 40, engages the sprocket chain 53 just below the upper sprocket wheel 55 and drives the same in the direction of the arrow mounted therein in Fig. 2 during certain operations of the device.

Figures 1, 2:
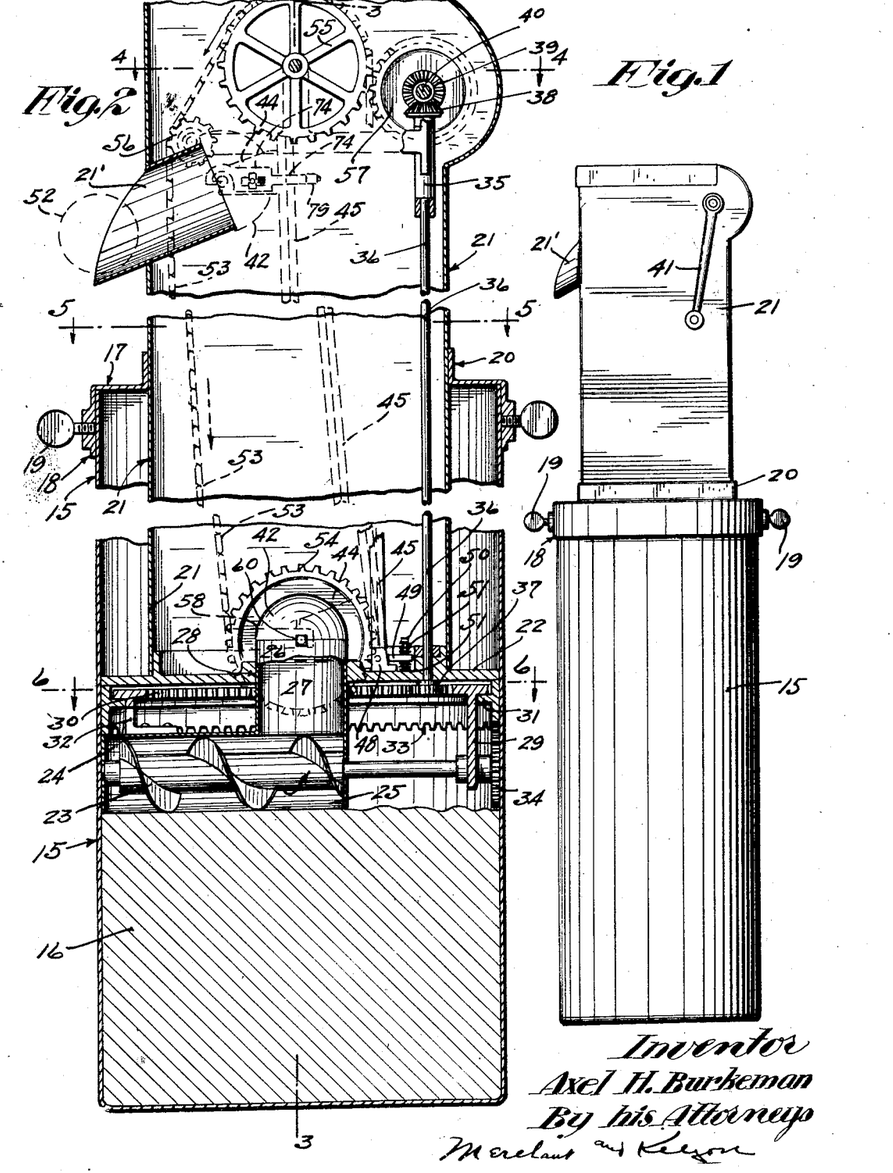
Fig. 1 is a side elevation of the device.
Fig. 2 is a view principally in central vertical section on an enlarged scale.
Figure 3:
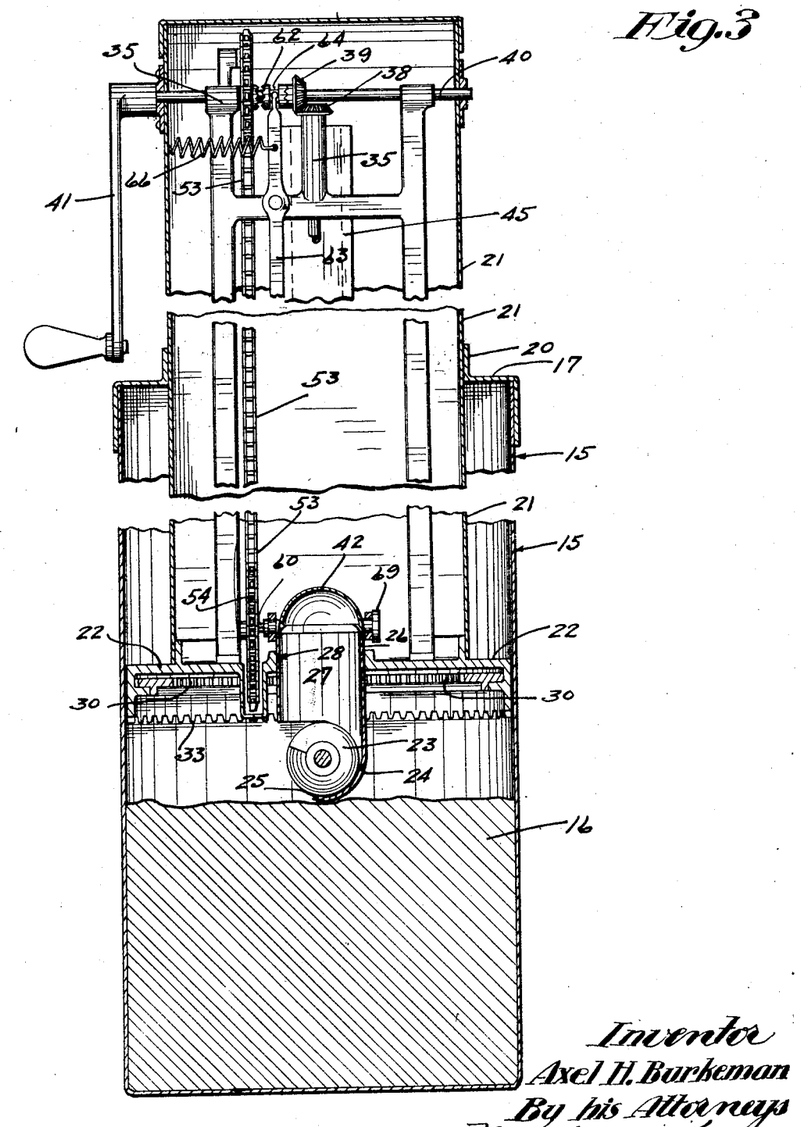
Fig. 3 is a transverse vertical section taken substantially on the line 3—3 of Fig. 2.
Figures 4, 5, 6:
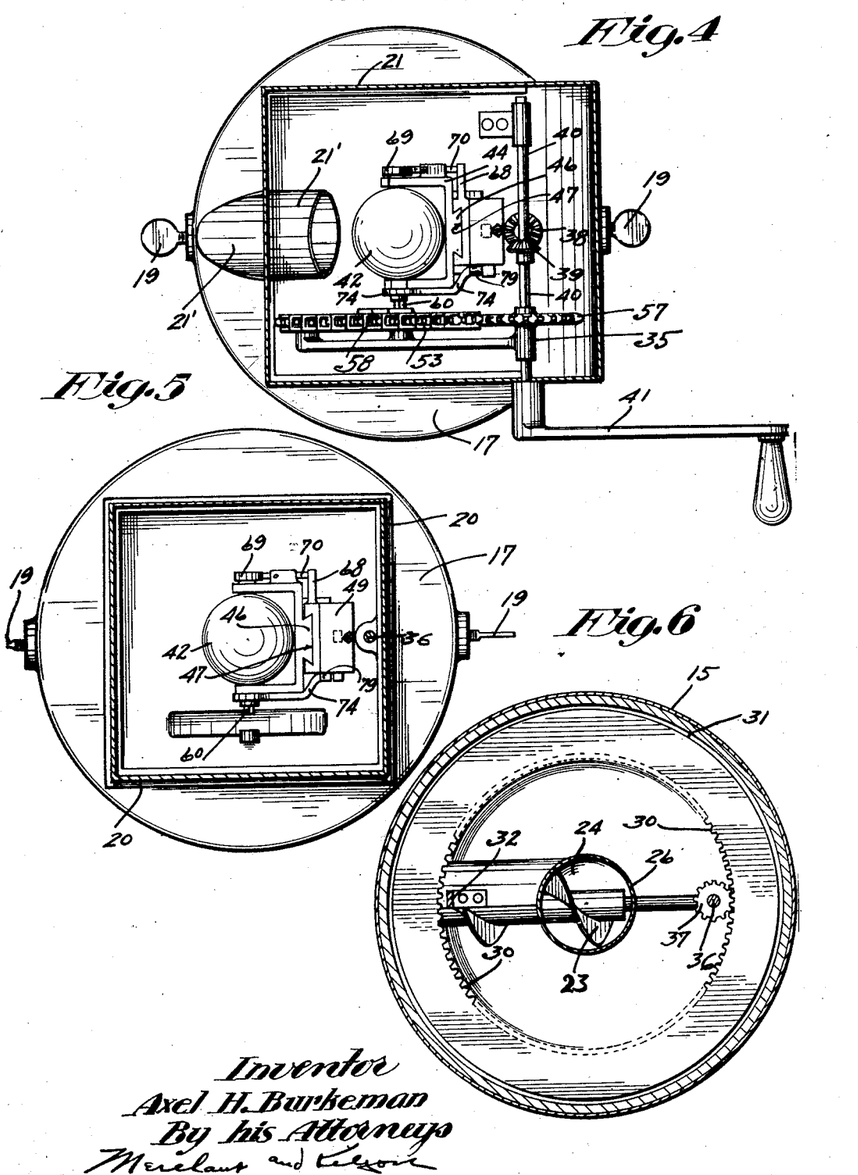
Fig. 4 is a horizontal section taken on the line 4—4 of Fig. 2.
Fig. 5 is a horizontal section taken on the line 5—5 of Fig. 2.
Fig. 6 is a horizontal section taken on the line 6—6 of Fig. 2.
Figures 11, 12, 13, 14:
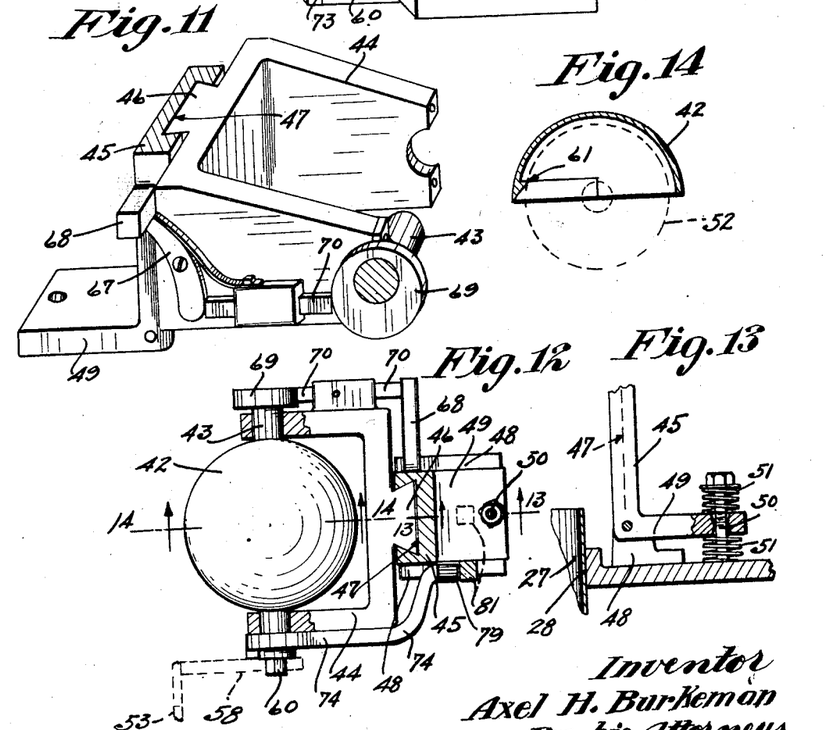
Fig. 11 is a perspective view of the carriage, looking at the opposite side thereof from that shown in Fig. 10.
Fig. 12 is a detail view, principally in plan, of the carriage and dipper.
Fig. 13 is a detail view with some parts sectioned on the line 13—13 of Fig. 12.
Fig. 14 is a view of the dipper in section taken on the line 14—14 of Fig. 12, and indicating therein, by means of broken lines, a sphere of the ice cream.

Rigidly secured to one of the links of the sprocket chain 53 is a coupling in the form of an arm 58 for releasably connecting the dipper 42 to said chain or carrier and for indirectly coupling the carriage thereto through said dipper. Said arm has in one of its longitudinal edges a square lock notch 59 adapted to straddle and interlock with a square lock lug 60, formed with the left-hand trunnion 43 on the dipper 42, when said dipper is in an inverted filling position, as shown in Fig. 2. During the initial traveling movement of the sprocket chain 53, the arm 58 will impart a one-half rotation to the dipper 42 and cause the same to cut the sphere of ice cream 52 from the mass of ice cream in the packing chamber 57. It may be here noted that the cutting edge of the dipper 42 is beveled inward and forms an annular internal ledge 61 of less diameter than the internal diameter of the dipper 42 so as to cut the sphere of ice cream 52 of a slightly less diameter than the internal diameter of the dipper, as shown in Fig. 14, so as to prevent suction which would tend to hold the sphere of ice cream 52 and prevent the same from rolling from the dipper 42 and the time said dipper is tipped at the receiving end of the spout 21.

At the completion of the one-half rotation of the dipper 42, during the initial movement of the sprocket chain 53, the same is in an upright position with the sphere of ice cream 52 therein, and the arm 58 will be under the lock lug 60 and thereby move the carriage 44 on the standard 45 and carry the dipper 42 upward. During the movement of the sprocket chain 53 over the sprocket wheel 55 the carriage 44 and dipper 42 will remain stationary due to the fact that the arm 58 is of such length as to hold said dipper with its trunnions 43 in axial alignment with the axis of the sprocket wheel 55 over which said chain is moving. During the movement of the arm 58 between the sprocket wheels 55 and 56, the dipper 42 is carried forward and carries the standard 45 therewith against the tension of the upper spring 51 and said dipper is also given substantially a one-fourth turn due to the inclination of the sprocket chain 53 between said sprocket wheel and positions the dipper 42, at the completion of this movement of said chain, close to the inner end of an inclined discharge spout 21' which projects from the front of the casing 21, and through which spout the sphere of ice cream 52 rolls from the tipped dipper 42. At the delivery end of the spout 21', the sphere of ice cream 52 may be caught in an ice cream cone or other receptacle, for instance, such as used in mixing malted milk.

Figure 10:
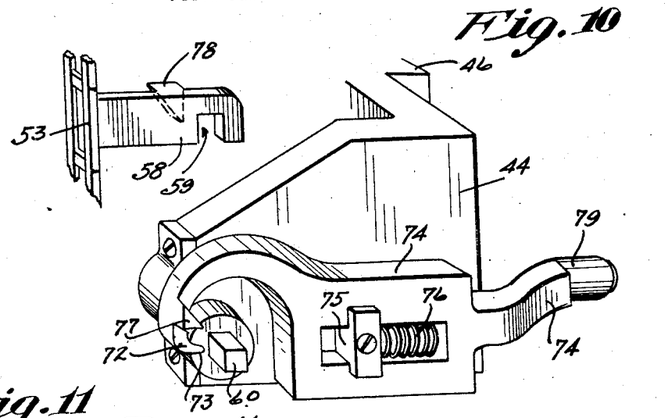
Fig. 10 is a fragmentary perspective view of the carriage and carrying arm.

During the movement of the sprocket chain 53 over the sprocket wheel 56 the arm 58, due to the smaller diameter of said sprocket wheel is given a backward and upward movement which inverts the dipper 42 and causes said arm to release the lock lug 60 and hence the dipper 42 and carriage 44 as shown in Fig. 10.

As the dipper 42 and carriage 44 are released from the arm 58, the compressed upper spring 51 will swing the standard 45 rearward to normal position and said carriage, under the action of gravity, will slide down the standard 45 and again position the dipper 42 in a capping position over the packing chamber 27.

The bevel gear 39 and sprocket wheel 57 are alternately secured to the shaft 40 for rotation therewith, under the action of the hand crank 41, by a double acting clutch 62 slidably mounted on said shaft between said gear and sprocket wheel, and which clutch is normally interlocked with the gear 39 so that during the initial movement of the hand crank 41, the conveyor 23 and scoop 24 are operated to pack the chamber 27 and dipper 42 with ice cream, and at which time the sprocket wheel 57 is idle and hence the dipper 42.

Figures 7, 8, 9:
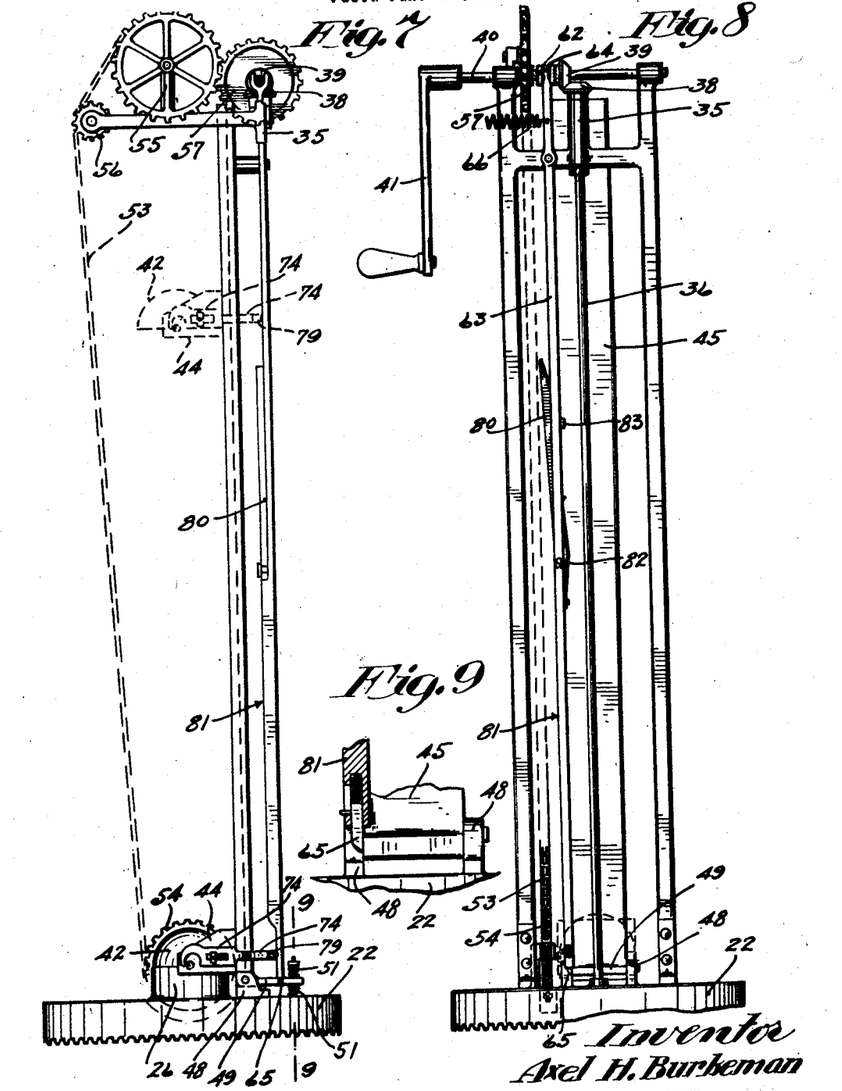
Fig. 7 is a view in side elevation with certain of the parts removed from the casing, certain of said parts being indicated by means of broken lines.
Fig. 8 is a rear elevation of the parts shown in Fig. 7.
Fig. 9 is a detail view with some parts sectioned on the line 9—9 of Fig. 7, on an enlarged scale.

To automatically move the clutch 62 out of engagement with the gear 39 and into engagement with the sprocket wheel 57, there is provided a long upright shipper lever 63 intermediately pivoted to the frame 35. The short or upper end of the lever 63 extends into a circumferential channel 64 in said clutch and its lower or long end terminates just above the upper face of the foot 49 and has mounted therein a spring-projected depending latch 65. A coiled spring 66 anchored to the casing 21 and attached to the short end of the shipper lever 63 is under strain to swing said lever and move the clutch 62 out of engagement with the gear 39 and into engagement with the sprocket wheel 57. This movement of the lever 63 is prevented by the engagement of the latch 65 with one of the vertical edges of the foot 49, as best shown in Fig. 9.

When the ice cream is packed in the dipper 42 by the conveyor 23, under a predetermined pressure controlled by the lower spring 51, said dipper will be lifted by said pressure and, acting through the carriage 44, will tip the standard 45 backward, which compresses said spring and moves the foot 49 downward out of engagement with the latch 65 and releases the shipper lever 63 which will then be moved by said spring and shift the clutch 62 out of engagement with the gear 39 and into engagement with the sprocket wheel 57, and position the latch 65 over the foot 49 which holds said latch inoperative. This movement of the shipper lever 63 stops further movement of the conveyor 23 and scoop 24 and hence the packing of ice cream in the chamber 27, and starts the movement of the sprocket chain 53. It may be here stated that the spring-projected latch 65, when held inoperative by the foot 49, will be moved against the tension of its spring by said foot during the forward tilting movement of the standard 45 by the arm 58 as the sprocket chain 53 travels from the sprocket wheel 55 to the sprocket wheel 56.

During the packing of the ice cream in the dipper 42, the carriage 44 is held against lifting movement on the standard 45 by a spring-pressed dog 67 intermediately pivoted to the right-hand side of the carriage 44 and projecting under a stop lug 68 on said standard, as shown in Fig. 11. This dog 67 is released from the stop lug 68 during the turning movement of the dipper 42 to cut the sphere of ice cream 52 from the mass, by a cam wheel 69 on the right-hand trunnion 43 acting on a loose sliding link 70 in a bearing on the right-hand side of the carriage 44 arranged to engage the free end portion of said dog.

The dipper 42 is held from turning while being packed with ice cream and has its lock lug 60 positioned to receive the lock notch 59 in the arm 58 by a rearwardly projecting lock dog 72 and a co-operating peripheral lock notch 73 in a hub on the left-hand trunnion 43. The lock dog 72 is integrally formed with a forwardly projecting neck on a block 74 secured to the left-hand side of the carriage 44 for horizontal sliding movement by a T-bearing 75, the body of which is square in cross-section and extends through a horizontal slot in said block. A coiled spring 76 in the slot in the block 74 is compressed between the rear end of said block and the bearing 75 and yieldingly holds a lock dog 72 in the lock notch 73.

To release the lock dog 72 from the lock notch 73, during the return movement of the arm 58 to interlock with the lock lug 60, there is formed on the neck of the block 74 a laterally projecting beveled cam lug 77, and formed with said arm is a cam lug 78 reversely beveled from the cam lug 77 and arranged to engage the same and draw the block 74 forward and thereby move said lock dog out of the lock notch 73.

The clutch 62 is moved out of engagement with the sprocket wheel 57 and into engagement with the gear 39 after the sphere of ice cream has been discharged from the dipper and during the return movement of the carriage 44 under the action of gravity to again position the dipper 42 in a capping position over the packing chamber 27 by a cam roller 79 on said carriage and a co-operating switch bar 80 on the shipper lever 63 arranged to direct said cam roller onto the back of an offset extension 81 on the lower or long end portion of the shipper lever 63 and thereby swing said lever against the tension of the spring 66 and draw its latch 65 from the foot 49, which is again projected into a position to engage one of the sides of said foot. The cam roller 79 is journaled on the end of a rearwardly laterally projecting rigid arm on the sliding block 74. The switch bar 80 is pivoted at its lower end to the front face of the shipper lever 63 and forms an extension of the offset portion 81 of said lever. This switch bar is yieldingly held in an inclined position to the left of the shipper lever 63 by a spring 82, and a stop lug 83 on said switch normally engages said shipper lever to position the switch bar 80. The upper end of the switch bar 80 is normally spaced away from the shipper lever 63 so that the cam roller 79 will pass back of the same during the return movement of the carriage 44 and engage the right-hand side of the shipper lever 63 and draw the same into a position to move the clutch 62 out of engagement with the sprocket wheel 57 and into engagement with the gear 39.

By reference to Fig. 7 it will be noted that the lower end of the shipper lever extension 81 terminates above the lower end of the shipper lever 63 so that said shipper lever will move free of the cam roller 79 when said shipper lever is raised by its latch 65 and moved by the spring 66 to shift the clutch out of engagement with the gear 39 and into engagement with the sprocket wheel 57. During the elevation of the carriage 44, the shipper lever 63 has been moved by the spring 66 over the foot 49 so that said lever is out of the way of the cam roller 79 and the switch bar 80 will yield to permit said roller to pass the same.

The operation of the above described ice cream dispensing device may be briefly described as follows:

The follower of the self-contained device and the parts associated therewith are inserted through the open top of the can 15 and supported on top of the mass of ice cream 16 therein, and the cover is secured to said can by means of the thumb screws 19, and which cover holds the device from turning but with freedom to move downward into the can as the ice cream is removed therefrom. The operator then turns the hand crank 41, at which time the clutch 62 is in engagement with the gear 39 and thereby, through the previously described connections, rotates the ring gear 30 which not only bodily swings the conveyor 23 and scoop 24 over the top of the ice cream 16 but imparts a rotary movement to said conveyor and thereby packs the chamber 27 and inverted dipper 42 with ice cream. When the pressure of the ice cream in the dipper 42 is sufficient to overcome the lower spring 51, said dipper will lift and thereby tilt the standard 45 rearward, which depresses the foot 49, thereby releasing the latch 65 and permitting the spring 66 to swing the shipper lever 63 into a position to move the clutch 62 out of engagement with the gear 39 and into engagement with the sprocket wheel 57, thus stopping the rotation of the gear 30 and hence the packing of the ice cream in the chamber 27 and dipper 42.

During this operation of the crank 41, the lock dog 72 is held in an inoperative position by the co-operating cam lugs 77 and 78 and the dipper is held from rotating by the interlocking engagement of the arm 58 with the lock lug 60, and the carriage 44 is held against lifting movement on the standard 45 by the lock dog 67 and co-operating lock lug 68. Further rotation of the hand crank 41 will start the movement of the chain 53, and the initial movement thereof will swing the arm 58 around the axis of the gear 54 and thereby impart a one-half rotation to the dipper 42, to right the same and thereby cut a sphere of ice cream 52 from the mass in the compartment 27. During this movement of the dipper 42 the cam 69, acting on the link 70, releases the dog 67 from the stop lug 68. The carriage 44 will then be moved upward on the standard 45 by the arm 58 until the sprocket chain 53 starts to carry the arm 58 around the sprocket wheel 55. During this movement of the arm, the carriage 44 remains stationary.

At the completion of this movement of the arm 58, the chain 53 carries the same forward and downward to the sprocket wheel 56, at which time the dipper 42 is tipped by the arm 58 and positioned at the receiving end of the spout 61, as shown in Fig. 2, thereby releasing the sphere of ice cream, which rolls from the dipper 42 through said spout and into the ice cream cone or other receptacle held to receive the same.

During this movement of the dipper 42 the same has been held from turning by the interlocking engagement of the arm 58 with the lock lug 60. Further movement of the sprocket chain 53 will cause the arm to swing backward and upward, thereby completely inverting the dipper 42 and releasing the arm 58 therefrom. At this time the upper spring 51 swings the standard 45 rearward into its normal operating position and the released carriage 44 drops under the action of gravity and carries the dipper 42 to its original position in which it caps the chamber 27. During this return movement of the carriage 44 the cam roller 79 is directed by the switch bar 80 into engagement with the shipper lever extension 81, thereby operating the shipper lever 63 to release the clutch 62 from the sprocket wheel 57 to stop further movement of the sprocket chain 53 and again interlock said clutch with the gear 39.

What I claim is:

1. In an ice cream dispensing device, the combination with a gravity actuated follower adapted to be placed in a can containing bulk ice cream, of a traveling dipper mounted on the follower, and means for causing the dipper to stop during its travelling movement and turn about on a fixed axis to cut a piece of ice cream and deliver the same outside of the can.

2. In an ice cream dispensing device, the combination with a follower adapted to be placed in a can containing bulk ice cream, of a traveling dipper mounted on the follower, cutting means for removing ice cream from the bulk and packing the same in the dipper, and means for operating the dipper to cut the ice cream packed therein from the bulk and deliver the same outside of the can.

3. In an ice cream dispensing device, the combination with a follower adapted to be placed in a can containing bulk ice cream, of a traveling dipper mounted on the follower, means for holding the dipper inverted, cutting means for removing ice cream from the bulk and packing the same in the inverted dipper, and means for operating the dipper to right the same, thereby cutting the ice cream therein from the bulk and discharging the same for delivery outside of the can.

4. In an ice cream dispensing device, the combination with a follower having a packing chamber and adapted to be inserted into a can containing bulk ice cream, of a traveling dipper mounted on the follower, means for holding the dipper inverted over said chamber, cutting means for removing ice cream from the bulk and packing the same in said chamber and dipper, and means for operating the dipper to right the same, thereby cutting the ice cream therein from the bulk and discharging the same for delivery outside of the can.

5. In an ice cream dispensing device, the combination with a follower having a packing chamber and adapted to be inserted into a can containing bulk ice cream, of a traveling dipper mounted on the follower, means for holding the dipper inverted over said chamber, a scraper and co-operating conveyor for removing ice cream from the bulk and packing the same in said chamber and dipper, and means for operating the dipper to right the same, thereby cutting the ice cream therein from the bulk and discharging the same for delivery outside of the can.

6. In an ice cream dispensing device, the combination with a follower having a packing chamber and adapted to be inserted into a can containing bulk ice cream, of a traveling dipper mounted on the follower, means for holding the dipper inverted over said chamber, a scraper and co-operating spiral conveyor, means for swinging said scraper and conveyor and rotating said conveyor to remove ice cream from the bulk and pack the same in said chamber and dipper, and means for operating the dipper to right the same, thereby cutting the ice cream therein from the bulk and discharging the same for delivery outside of the can.

7. In an ice cream dispensing device, the combination with a follower having a packing chamber and adapted to be inserted into a can containing bulk ice cream, of a traveling dipper mounted on the follower, means for holding the dipper inverted over said chamber, a non-rotating ring gear on the follower, a rotatable ring gear carried by the follower, a scoop and a conveyor carried by the rotatable ring gear, means for driving the rotatable ring gear, means for operating the conveyor from the non-rotating ring gear during the movement of the rotatable ring gear, means for removing ice cream from the bulk and packing the same in said chamber and dipper, and means for operating the dipper to right the same, thereby cutting the ice cream therein from the bulk and discharging the same for delivery outside of the can.

8. The structure defined in claim 7 in further combination with automatic means controlled by the pressure of the ice cream on the dipper for stopping the action of the scoop and conveyor and starting the operation of the dipper.

9. The structure defined in claim 7 in further combination with automatic means controlled by the pressure of the ice cream on the dipper for stopping the action of the scoop and conveyor and starting the operation of the dipper, and automatic means controlled by the movement of the dipper for stopping the operation of the dipper and again setting the first noted automatic means for action.

10. In an ice cream dispensing device, the combination with a follower having a packing chamber and adapted to be inserted into a can containing bulk ice cream, of a dipper, and a carriage for the dipper normally holding the same inverted over said chamber, means for operating the dipper and carriage, means for removing ice cream from the bulk and packing the same in said chamber and dipper, propelling means for alternately operating the two first noted means, and automatic means controlled by the pressure of ice cream on the dipper for causing said propelling means to stop the means for removing ice cream from the bulk and packing the same in said chamber and dipper and set in operation said means for operating said dipper and carriage to cause said dipper to cut the ice cream therein from the bulk and carry the same outside of the can.

11. The structure defined in claim 10 in further combination with automatic means controlled by the pressure of the ice cream on the dipper for returning the dipper and carriage to the packing chamber.

12. In an ice cream dispensing device, the combination with a follower having a packing chamber and adapted to be inserted into a can containing bulk ice cream, of a carriage, a dipper movably mounted on the carriage, a carrier, a coupling for releasably connecting the carriage to the carrier, a dog for holding the carriage with the dipper inverted over said chamber, said coupling being arranged to hold the inverted dipper from moving on the carriage, means for removing ice cream from the bulk and packing the same in the inverted dipper, propelling means for alternately operating said means and carrier, automatic means controlled by the pressure of ice cream on the dipper for causing said propelling means to stop said means from removing ice cream from the bulk and packing the same in said chamber and dipper and operate said carrier, said coupling, during the initial movement of the carrier, being arranged to right the inverted dipper and thereby cause the same to cut the ice cream packed therein from the bulk in said chamber, and means operative by the righting movement of the dipper for operating said dog to release the carriage for movement with the carrier, said coupling being adapted to hold the dipper in an upright position during its movement with the carrier and then tip said dipper to discharge the ice cream therein.

13. The structure defined in claim 12 in further combination with means for causing said coupling, after the discharge of the ice cream from the dipper and under the traveling movement of the carrier, to invert said dipper and then automatically to release the same and permit the carriage to return said dipper to normal position under the action of gravity.

14. The structure defined in claim 12 in which said coupling, after the discharge of the ice cream from the dipper, inverts said dipper and then automatically releases the same and permits the carriage to return said dipper normal position under the action of gravity, in further combination with an automatic lock dog for holding the inverted dipper when released from said coupling and during its return movement to normal position.

15. The structure defined in claim 12 in which said coupling, after the discharge of the ice cream from the dipper, inverts said dipper and then automatically releases the same and permits the carriage to return said dipper to normal position under the action of gravity, in further combination with an automatic lock dog for holding the inverted dipper when released from said coupling and during its return movement to normal position, and means on the carrier for releasing said latch holding the dipper from moving in respect to said carriage during the return movement of said carriage.

16. The structure defined in claim 12 in which said coupling, after the discharge of the ice cream from the dipper, inverts said dipper and then automatically releases the same and permits the carriage to return said dipper to normal position under the action of gravity, in further combination with an automatic lock dog for holding the inverted dipper when released from said coupling and during its return movement to normal position, means on the carrier for releasing said lock dog holding the dipper from moving in respect to said carriage during the return movement of said carriage, and means operated by the return movement of the carriage to normal position to cause said propelling means to stop the movement of the carrier and set the propelling means to operate said means for removing ice cream from the bulk and packing the same in said chamber and dipper.

17. In an ice cream dispensing device, the combination with a follower having a packing chamber adapted to be inserted into a can containing bulk ice cream, of an endless traveling chain carried by the follower, a yieldingly held standard mounted on the follower, a carriage mounted on the standard, a dipper turnably mounted on the carriage, an automatic dog for holding the carriage from moving on the standard with the dipper inverted over said chamber, an arm on the chain releasably holding the dipper for turning on the carriage and for moving the carriage on the standard, means for removing ice cream from the bulk and packing the same in said chamber and inverted dipper, driving connections including a clutch for alternately driving said means and chain, a shipper lever for operating the clutch, yielding means operative on the shipper lever to hold the clutch to drive the chain, a spring projected latch on the shipper lever normally engaging the standard to hold the clutch to drive said means, said standard being arranged to yield under a predetermined pressure of ice cream on the dipper and thereby release the latch holding the shipper lever, said arm being arranged during the initial movement of the chain to right the dipper, thereby cutting the ice cream therein from the bulk in said chamber, and means operative by the righting movement of the dipper to release the dog holding the carriage in respect to the standard, said chain and arm being arranged to swing the standard and tip said dipper to position said dipper for the discharge of the ice cream therein into said spout.

18. The structure defined in claim 17 in further combination with means for causing said arm, after the discharge of the ice cream from the dipper, to invert said dipper and then automatically release the same together with the carriage to permit said carriage to return the dipper to the packing chamber.

19. The structure defined in claim 17 in which said arm, after the discharge of the ice cream from the dipper, inverts said dipper and automatically releases the dipper and, indirectly, the carriage which returns the dipper to the packing chamber, and in further combination with a second automatic lock dog for holding the dipper from turning on the carriage when the dipper is released by said arm and positioned to be re-engaged by said arm.

20. The structure defined in claim 17 in which said arm, after the discharge of the ice cream from the dipper, inverts said dipper and automatically releases the dipper and indirectly the carriage which returns the dipper to the packing chamber, and in further combination with a second automatic lock dog for holding the dipper from turning on the carriage when the dipper is released by said arm and positioned to be re-engaged by said arm, and means operated by the return movement of the carriage on the standard for releasing said second automatic lock dog after said dipper has been re-engaged and held by said arm during its return movement.

21. The structure defined claim 17 in which said arm, after the discharge of the ice cream from the dipper, inverts said dipper and automatically releases the dipper and indirectly the carriage which returns the dipper to the packing chamber, and in further combination with a second automatic lock dog for holding the dipper from turning on the carriage when the dipper is released by said arm and positioned to be re-engaged by said arm, means carried by the carriage for releasing said second automatic lock dog after said dipper has been re-engaged and held by said arm during its return movement, and further means operated by the return movement of the carriage for operating the shipper lever to shift said clutch.

22. In an ice cream dispensing device, the combination with a gravity actuated follower adapted to be placed in a can containing bulk ice cream, of a casing mounted on the follower having a discharge spout, a cover on the can having an opening through which the casing is free to move up and down but is held from turning with respect to the can, of a traveling dipper mounted in the casing, and means for causing the dipper to stop during its travelling movement and turn about a fixed axis to cut a piece of ice cream and deliver the same outside of the can.

23. The structure defined in claim 22 in which the dipper has on its cutting edge an internal ledge of less diameter than the interior of the dipper.

24. In an ice cream dispensing device, the combination with a follower adapted to be placed in a can containing ice cream, of a travelling dipper mounted on the follower, and means for causing the dipper to stop during its travelling movement and turn about a fixed axis to cut a piece of ice cream.

In testimony whereof I affix my signature.

AXEL. H. BURKEMAN.